(No Model.)
I. G. COLCORD.
TOOTH FOR THRASHING MACHINES.
No. 453,624. Patented June 9, 1891.
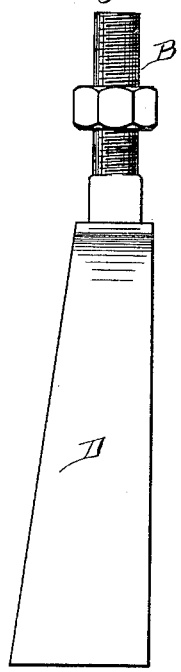
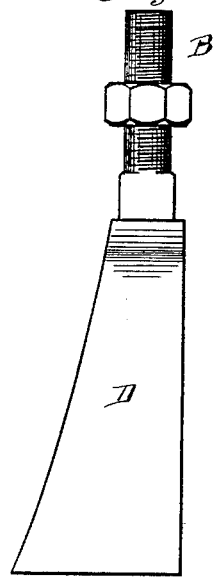
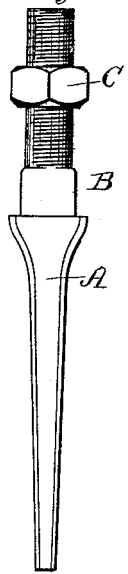
Witnesses
M. P. Smith
S. C. Sweets
Ivory G. Colcord
by Thomas G. Orwig
his Atty.

UNITED STATES PATENT OFFICE.

IVORY G. COLCORD, OF DES MOINES, IOWA.

TOOTH FOR THRASHING-MACHINES.

SPECIFICATION forming part of Letters Patent No. 453,624, dated June 9, 1891.

Application filed September 2, 1890. Serial No. 363,746. (No model.)

*To all whom it may concern:*

Be it known that I, IVORY G. COLCORD, a citizen of the United States of America, and a resident of Des Moines, in the county of Polk and State of Iowa, have invented a new and useful Tooth for Thrashing-Machines, of which the following is a specification.

Heretofore hard metal has been applied to the surfaces of teeth for thrashing-machines in various ways to re-enforce them and to prevent them from wearing out rapidly.

My object is to apply hard metal to the parallel side-faces of a tooth in such a manner that a cutting-edge will be maintained on each side of the front face of the tooth; and my invention consists in the construction of parallel hard-metal cutting-edges on the body of a tooth made of soft metal.

My invention consists, further, in certain details of construction, as hereinafter set forth, pointed out in my claim, and illustrated by the accompanying drawings, in which—

Figures 1 and 2 are side views of my cylinder and concave teeth, respectively. Fig. 3 is a sectional view through the line $x\,x$ of Fig. 1. Fig. 4 is a face view of one of said teeth.

A represents the body portion of my tooth, and is preferably made of soft malleable iron. The outer end portion of the body portion A is wider and thinner than the inner end thereof.

B represents the shank of my tooth, and is formed integral with the inner end of the body portion thereof. This shank B has an angular portion at its juncture with the portion A, adapted to be inserted within an opening of corresponding size and shape in the bar of a cylinder or concave to prevent the tooth from turning in said cylinder or concave bar. A shoulder is formed on the inner end portion of the body portion A to prevent the tooth from slipping through the opening in said bar.

The outer end portion of the shank B is screw-threaded and provided with a nut C, with which to fasten the tooth within the aforesaid opening in the bar.

D D represent thin plates of metal, preferably made of hardened steel, and fixed to the broad sides of the body portion A in any suitable way or manner. An improved tooth is thus provided that will present two cutting-edges as long as it is used, by reason of the fact that the soft metal composing the portion A will wear off faster than the plates D D, leaving the thin edges of the said plates sharp to beat out the grain, which latter is especially desirous in thrashing the seed from "timothy" grass and flax.

I claim as my invention—

The herein-described tooth for thrashers, consisting of a shank and blade made of soft iron, plates of steel or hard metal fixed to and covering the broad sides of said blade, and means for attachment to a cylinder or concave bar.

IVORY G. COLCORD.

Witnesses:
C. C. BULKLEY,
S. C. SWEET.